United States Patent

Hale et al.

[11] Patent Number: 5,953,689
[45] Date of Patent: Sep. 14, 1999

[54] BENCHMARK TOOL FOR A MASS STORAGE SYSTEM

[75] Inventors: Paul F. Hale, Hudson; William Glynn, Sherborn, both of Mass.

[73] Assignee: EMC Corporation, Hopkinton, Mass.

[21] Appl. No.: 09/041,398

[22] Filed: Mar. 12, 1998

[51] Int. Cl.⁶ .................................................. G06F 13/00
[52] U.S. Cl. .................. 702/186; 371/21.1; 395/182.03; 395/182.16; 702/182
[58] Field of Search ..................................... 702/186, 182; 395/500, 800.14, 182.04, 182.03, 182.01, 183.16; 371/21.1

[56] References Cited

U.S. PATENT DOCUMENTS

| | | | |
|---|---|---|---|
| 5,257,367 | 10/1993 | Goodlander et al. | 707/204 |
| 5,269,011 | 12/1993 | Yanai et al. | 395/280 |
| 5,603,062 | 2/1997 | Sato et al. | 395/872 |
| 5,721,898 | 2/1998 | Beardsley et al. | 707/3 |
| 5,724,501 | 3/1998 | Dewey et al. | 395/182.07 |

*Primary Examiner*—John Barlow
*Assistant Examiner*—Hien Vo
*Attorney, Agent, or Firm*—Fish & RIchardson P.C.

[57] ABSTRACT

A method for measuring mass storage system performance in which the mass storage system has a plurality of disk drive storage elements controlled by a disk drive controller, the controller typically having a cache memory, and the controller receiving commands and data from and returning at least data to a plurality of host computers, provides the flexibility of issuing commands to the controller in a variety of different configurations from a plurality of hosts in a time synchronized and organized fashion. The method features the steps of synchronizing, to a clock time of one of the host computers, designated the master host computer, the clock times of each other of the host computers, designated the client host computers. The method further features sending test requests, for the mass storage system, from the master host computer to each of the client host computers, executing at each host computer a test request sequence by sending commands to the mass storage system, accumulating at each host computer data regarding performance of the mass storage system, the data being in response to the requests or commands sent by each particular host computer, and sending, from each client host computer to the master host computer, data regarding the performance of the mass storage system in response to the host generated commands. Some significant data reduction techniques control and organize the data for later analysis. Time delays and different configurations of both host and storage elements can be effected with a time delay inserted after each command sent from a host.

11 Claims, 3 Drawing Sheets

| REQUIRED | OPTIONAL |
|---|---|
| Number of logical disks | ID of devices being tested |
| Number of "child" processes to start | ID of master & client hosts |
| Number of capture response times | I/O type (sequential or random) |
| Number of response times | Number of I/O operations performed to correct offset |
| Buffer size | Displacement from offset |
| Offset size | Delay between commands |
| Maximum range | Initial byte offset |
| Time of test | Number of seeks for random I/O |
| read/write size | Data reduction method |
| read/write mix | ICDA percent hit rate |

FIG. 4

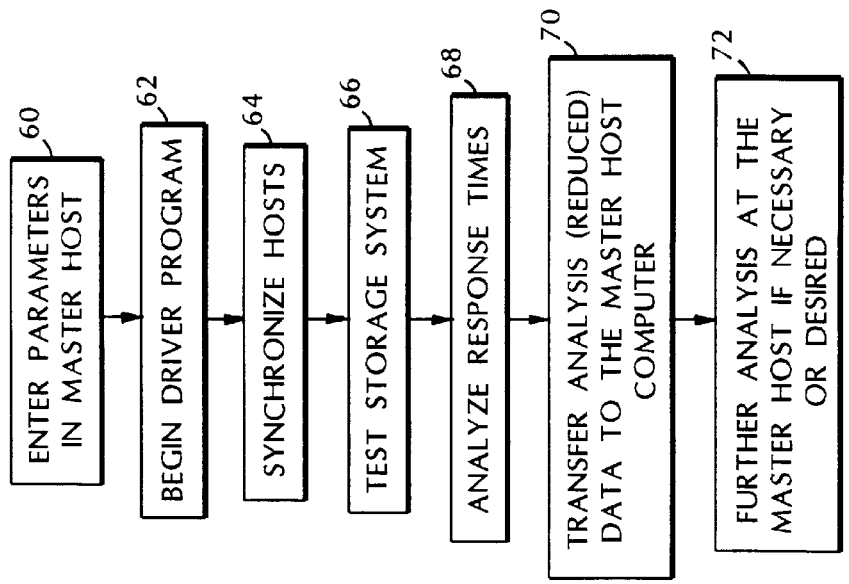

FIG. 3

BENCHMARK TOOL FOR A MASS STORAGE SYSTEM

BACKGROUND OF THE INVENTION

The invention relates generally to tools for measuring the performance of mass storage systems, and more particularly, to a method and apparatus for measuring the performance statistics of a plurality of the disk drive elements controlled through a disk drive controller connected to a plurality of host computers.

As the size and complexity of computer systems increase, including both of the number of host computers and the number of disk drive elements, it becomes increasingly important to measure and understand the functions and parameters which affect the performance of the system. The performance of the system can be typically measured in terms of input/output (I/O) response times, that is, the time it takes for a read or write command to be acted upon, as far as the host computer is concerned, by the disk drive controller system.

It is well known, in the field, to measure, usually using a single parameter, the instantaneous or average response time of the system. Typically, a host computer outputs one or more I/O requests to the disk drive controller, and then measures the time for a response to be received from the disk drive controller. This time duration, while representative of the response of a specific read or write command to the disk drive system, is most often not representative of the actual performance which can be obtained from the system.

A similar distortion, not representative of system performance, can occur when average response time values are determined. For example, a disk controller, using a cache memory in its write process, can have substantially different write time responses depending upon the availability of cache memory. An average response (the average of, for example, a write where cache was available and one where cache was not available) would be misleading and meaningless.

The performance of a large storage system is particularly difficult to measure since more than one of the host computers, which connect to be disk drive controller(s), can operate at the same time, in a serial or in a parallel fashion. As a result, a plurality of disk drive elements, usually arranged in a disk drive array, operating in either an independent fashion, a RAID configuration, or a mirrored configuration, for example, can have a significant yet undetectable bandwidth or operational problem which cannot be addressed, or discovered, when commands are sent only from a single host computer. Tools have not previously existed which enable a user to accurately and automatically measure the performance of the large mass storage system over time.

SUMMARY OF THE INVENTION

The invention relates to a method for measuring the system performance of a mass storage system having a plurality of disk drive storage elements controlled by a disk drive controller. Typically the disk drive controller has a cache memory. The controller receives commands and data from, and returns at least data to, a plurality of host computers. The method features of the steps of synchronizing the clock time of each other of the host computers (the client host computers) to the clock time of one of the host computers (the master host computer); sending test requests, for the mass-storage system, to each of the other host computers from the one host computer; substantially simultaneously beginning execution of a test, at each host computer, by sending data and/or commands to the mass storage system; accumulating, at each host computer, data regarding the performance of the mass storage system during said test; and sending to the one host computer, from each of the other host computers, data regarding the performance of the mass storage system in response to the host generated commands.

Advantageously, therefore, the system provides statistics describing the dynamic performance of the mass storage system, from the host computers to the disk drive elements, wherein not only can individual operations be tested, but sequences of operations can be set up, with selected initial conditions, and accurately tested. The method and apparatus of the invention further advantageously enable the user to configure, set, and determine read/write sequencing and a relative mix (of read and write commands), as well as enabling the dynamic performance of the system to be repeatedly enabled and tested for consistency, accuracy, and effectiveness.

BRIEF DESCRIPTION OF THE DRAWINGS

Other features and advantages of the invention will be apparent from the following description, taken together with the drawings, in which:

FIG. 3 is a flow chart showing overall operation of the invention;

FIG. 4 shows a table of arguments in accordance with the invention; and

DESCRIPTION OF THE PREFERRED PARTICULAR EMBODIMENT

Figure 1:
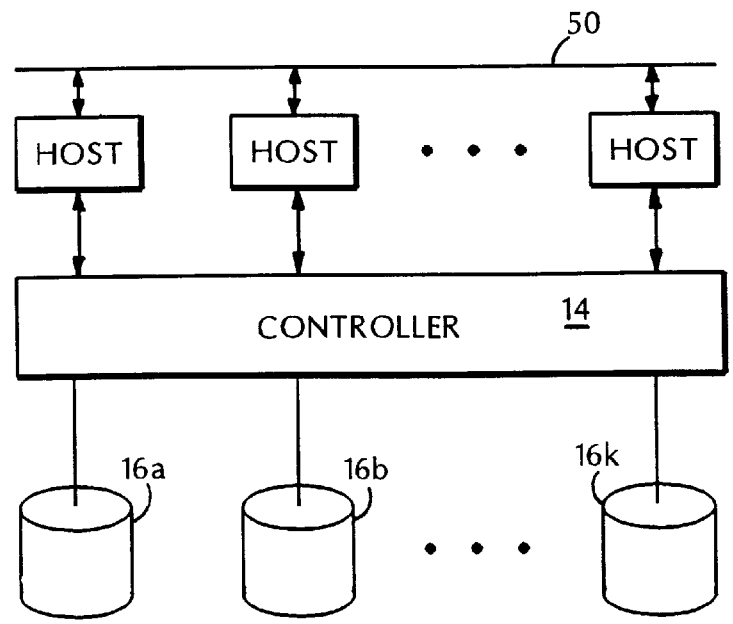
FIG. 1 shows a typical system in which the invention is useful.

Referring to FIG. 1, the invention relates to a computer system wherein a plurality of host computers or processors 12a, 12b, . . . , 12n, connect to a storage controller system 14, such as the EMC Symmetrix® storage system. The controller acts as the interface between the host computers and a plurality of mass storage devices, such as, for example, disk drive elements 16a, 16b, . . . , 16k. Data written by the host or read from the disk drive elements passes through the memory controller system which acts a two way communications path with substantial capabilities. The disk drive elements can have any of, or a combination of, a plurality of configurations. For example, in some systems, the data from a host is uniformly striped across all of the disk storage devices; and in other systems, the data from a host is stored on the disk drives 16 according to a RAID protocol or an n-way mirrored protocol. In yet other embodiments of the invention, all of the data from a particular host may be stored in a logical volume on a single disk drive or allocated to different logical volumes of the same or different disk drives, depending upon the nature and the source of the data and host. A host computer can also read data from one or more of the disk drive units to generate a single host logical volume.

To determine the limits of performance in the system, the hosts can, according to the invention, be operated to exercise and test the memory controller and the disk drive elements. Thus potential problems which can create a bottleneck on those communication lines connected from the disk drive controller to either the disk drive elements or the hosts can be identified, as can cache memory loading issues in the drive controller.

Figure 2:
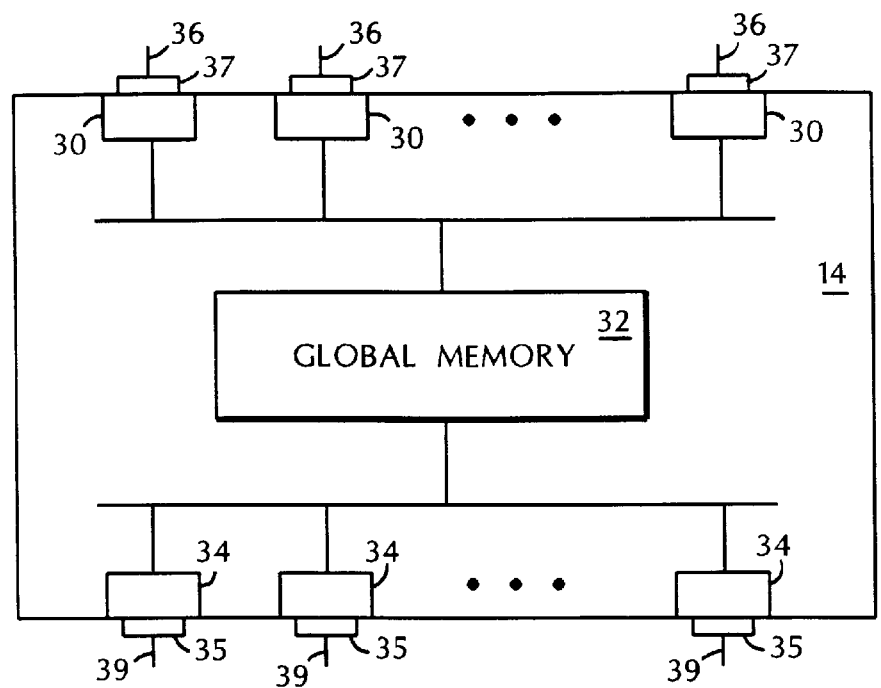
FIG. 2 shows, in more detail, a particular controller system in which the invention finds particular use.

Referring to FIG. 2, in a particular embodiment according to the invention, the disk controller has a plurality of host adaptors (also referred to as channel directors or SA's) 30 connecting to a global memory 32 through which, in this embodiment, all data and commands flow. The global memory 32 is connected to a plurality of disk adaptors (also referred to as DA's or disk directors) 34 which connect the disk drives 16 to storage or drive ports 35 of the adaptors 34 over lines 39. In accordance with this particular embodiments of the invention, each host adaptor has a SCSI adaptor embedded therein which communicates with the global memory 32. In the illustrated embodiment, the read and write operations pass through each SCSI adaptor unit 34 and to the disk adaptors to the disk drive elements. Each host adaptor connects to one or more host computers over buses 36 at host processor ports 37 of the host adaptors. The host processors also can communicate with each other, for example over a SCSI bus 50 (FIG. 1).

Referring now to FIG. 3, in general operation, a series of arguments or parameters describing the tests or test to be performed within the mass storage system is entered, typically manually, into a master host processor (step 60). The parameters, represented by the data entered into the master host processor, will define and effectively control the operations by which the hosts gather statistics describing performance of the mass storage system. The arguments or parameters data are entered into a main control program (step 62). Once the parameters are set in the main control program, operation transfers to a main driver program, running on the master host computer. The driver program controls operation not only of the master host computer, but of all of the other (client) host computers as well.

The drive program effects time synchronization of the host computers and causes the next lower level controller programs (the programs which control the commands and data sent to and received from the disk controller), to operate in time synchronization (step 64). In order to achieve both time synchronization of the host computers, and accurate and timely operation of the mass storage system, the driver program first causes each of the client host computers to synchronize its clock with the master host computer. Further, in response to a communication from the master computer, all host computers begin to issue commands to the controller of the mass storage system, based upon the arguments or parameters previously stored in their memories.

After the necessary test defining parameters are stored in the memory of each respective host computer, the test is ready to proceed, and the next lower level controller program in each of the host computers, designated the scripting program, causes each of the host computers to command the controller in accordance with the command information provided to it by the master host computer driver program (step 66). (Note that the master host computer itself also "receives" such information from the driver program.)

Depending upon the particular disk controller system, one of two possible methods of operation can proceed. If the controller is a "simple" controller, each host computer will itself measure and collect statistics (the raw data) identifying, for example, the response time for each command which it sends to the controller. These response times are collected in a manner which allows the host computer to identify to which command the response time corresponds. Alternatively, for a controller such as the EMC Symmetrix® controller, the controller itself can provide this raw data for each of the commands which it receives from the hosts. Under this latter circumstance, the controller will return not only the data requested by the command, but in addition, in response to special host requests, the statistics describing the response time for the command which is being received. That information is provided to the particular host which requested the operation.

Each host computer, then, analyzes the response time data which it either has received or generated itself (step 68). In the illustrated embodiment of the invention, this raw data, which can amount to several gigabytes of information, is analyzed preferably, at each host computer. The analysis is basically a data reduction analysis whereby each host computer, rather than maintaining the full raw data set, operates to reduce of the received response times to a smaller set of data. In a first particular embodiment, the data is placed into "buckets", each bucket representing, for example, 0.25 seconds. (In other embodiments, differently sized buckets can be employed). The buckets, however, collectively represent a non-overlapping, continuous sequence of time duration.

In another embodiment of the invention, the response times can be accumulated for a period of time, so that the data returned to the master host computer will represent the cumulative response times for all commands issued during each of a plurality of non-overlapping contiguous larger durations of time, for example 5 or 10 seconds. That is, for each of the contiguous time periods, the response times for each command initiated in the period will be accumulated. This is particularly useful where the tests can run for several hours and in which tens of gigabytes of data will be produced for each of the host computers.

No matter what method is used to collect and/or reduce the data, the master host computer collects the resulting data from each other host computer (step 70). The master host computer, at the driver program level, then can further analyze the reduced data, as required by the user, to obtain additional statistics (step 72). These additional statistics can provide further insight and understanding into the performance and operation of the entire of computer/memory system.

Referring now to the operation of the computer system in more detail, and referring to FIG. 4, at the main program level, in the master host computer, a number of parameters or arguments are manually entered and recorded. These are illustrated in the table of FIG. 4. Turning to the table, the initial parameters include the number of logical disks to be tested, the number of "child" processes to start (as that term is used in the Unix operating system), the number of capture response times, the number of response times to collect, the buffer size requested, and the offset size, in bytes to mod a randomly generated number with (this supports seeks on random reads and the writes to even boundaries of stripes). Other required arguments include the maximum range in megabytes to span the device, the time in seconds to effect read or write operations, the size in actual bytes to read and write, and the percent of operations which will be read operations (with the remainder being write operations). Other optional arguments, in the illustrated embodiment, include identification of the devices to test, identification of which device will be the master host computer and whether the I/O operations will be sequential or random. Other optional arguments include the number of I/O operations to perform, once the system has "seeked" to the correct offset, and the displacement in bytes back from a particular offset.

In this particular embodiment of the invention, there are the yet further optional arguments which include the number of microseconds to delay between I/O commands, the initial byte offset to start a read or write command, the number of seeks to perform for random I/O's, the method in which response start times will be collected (for example the use of buckets), and a parameter identifying a percent hit rate to be implemented in connection with ICDA's with controller cache to read or write a specific number of megabytes of data over a random number range.

Figure 5:
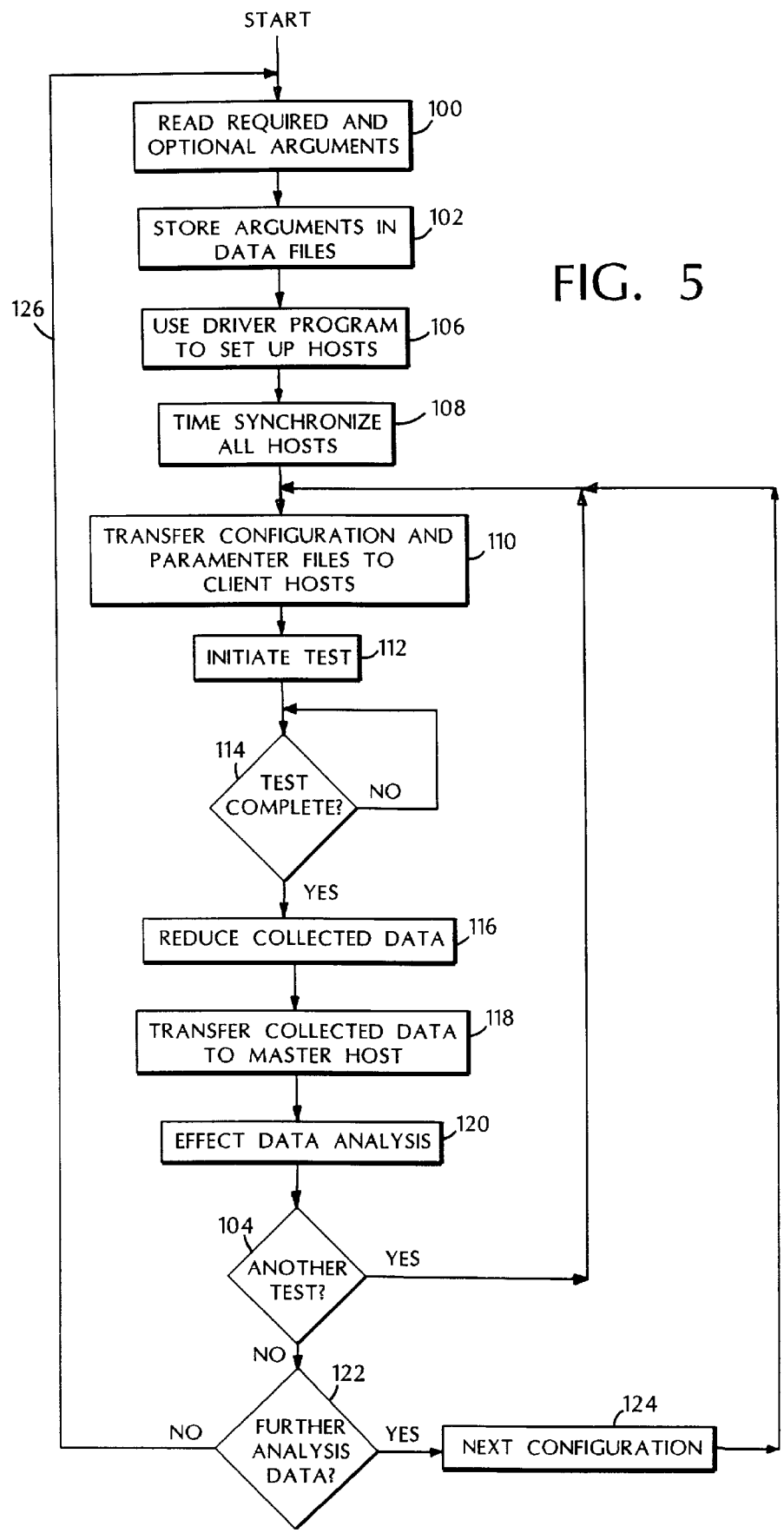
FIG. 5 shows a more detailed flow chart in accordance with the invention.

Referring now to FIG. 5, the operation of the system, in accordance with the invention, can be viewed as a series of nested loops, the outer most loop being the main program, the next loop being the driver program, and the inner loop being the scripting program. In the outer loop, the system receives the arguments or parameters which control or set up the operation of the test program. Those parameters or arguments have been described above in connection with the table of FIG. 4. Referring to FIG. 5, the main program receives (at step 100) and enters (at step 102) the various arguments in its data files. In a preferred embodiment of the invention, each test is performed at least three times (tested at step 104) to ensure a statistical averaging which creates both confidence and accuracy, thereby avoiding variability and statistical anomalies.

Once the arguments have been stored in the data files on the host computer, which is designated as the master computer, the main program invokes the driver program, running on the master computer, to set up all of the hosts. This is indicated at step 106. The driver program, in response to the arguments provided, will initialize the cache memory, if necessary, and will initialize as well, all of the host computers, including the master host computer. The driver program, at 108, causes all of the host computers to be time synchronized. It performs this function by sending to each of the client host computers over channel 50, the clock time of the master host computer. Each client host computer, now running the scripting program in response to the initialization by the driver program and communications from that program over communications channel 50, linking all of the host computers, then sets all of the client host computer clocks, with the result that all of the host computers are operating with time synchronized clocks. This is indicated at 108.

The driver program then transfers to each of the client host computers the necessary configuration and parameter files with which the scripting program, at the client host computers and at the master host computer, will operate to test the mass storage system. This is indicated at step 110.

Next, the driver program initiates testing of the mass storage system by communicating to each host computer, directly for the master host computer and over the interconnecting communications channel 50 for the client host computers. As a result, each host computer begins sending commands and data to and receives at least data from the mass storage system at the same time. At this point, it is the configuration and parameter input to the master host computer, and delivered to the client computers, which controls the actions of each of the client host computers. Thus, the information and arguments provided can cause only a subset of the host computers to communicate and issue commands to the mass storage system, and/or only a specific set of logical units at the mass storage level may be exercised in a specific configuration dictated by the arguments input at step 100.

The scripting program, when a test is complete, as tested at 114, then reduces the data which it has collected (step 116). As noted above, the data reduction process, if one is used, can use either a bucket compression or an accumulation compression approach. (The approach can be dynamically charged during the test sequence by, for example, a user command to the master host computer.) Alternatively, the initial raw data may be maintained in its original form. The raw data can include, for example, the response times to read and/or write operations which have been commanded in accordance with the input parameters. (In accordance with the invention, when there is a mix of read and write commands, the system first issues a block of one set of the commands and then a block of the other set of commands. For example, when there are to be 40% read commands, the system can issue three write commands, followed by two read commands, followed by three write commands, etc. In this manner, the associated statistical data which is collected can be directly correlated to a particular read or write command.)

Once the data is in its final (and most likely, reduced) form at the client host computers, it is transferred over channel 50 to the master host computer. This is indicated at step 118. Thereafter the master host computer can effect a more comprehensive data analysis, at step 120, to determine the performance of the mass storage system, for example, the number of I/O's, and in particular, the number of writes, as a function of time. The driver program then determines whether another test is to be performed, at step 104, and if not, the driver checks to determine whether further analysis of the data is to be performed (at step 122). If further analysis data is to be collected using a new configuration, the new configuration is generated at step 124, and the process begins again starting with step 110. If no further analysis data is needed, the system returns to the beginning of the process as indicated by loop 126. In this manner, the three nested loops of this preferred particular embodiment, loops represented by the main program, the driver program, and the scripting program, can provide effective and dynamic testing of the storage system to determine its performance under a large variety of situations.

Additions, subtractions, and other modifications of the illustrated embodiment of the invention will be apparent to those practiced in this field and are within the scope of the following claims.

What is claimed is:

1. A method for measuring system performance in a mass storage system, the storage system having a plurality of disk drive storage elements controlled by a disk drive controller, said controller receiving commands and data from and returning at least data to a plurality of host computers, said method comprising the steps of synchronizing, to a clock time of one of said host computers, the clock times of each other of said host computers, sending test requests, for said mass storage system, from the one host computer to each of said other host computers, executing at each host computer a said test request by sending commands to said mass storage system, accumulating, at each host computer, data regarding performance of said mass storage system, in response to the requests sent by said host computer, and sending, from each said other host computer to said one host computer, data regarding the performance of said mass storage system in response to said one host generated commands.

2. The method of claim 1 further comprising the step of
data compressing, at each other host computer, said performance data, prior to said sending step.

3. The method of claim 2 wherein said data compressing step comprises the step of
bucket compressing said performance data at said host.

4. The method of claim 2 wherein said data compressing step comprises the step of
cumulatively compressing said performance data at said host.

5. The method of claim 2 further comprising the steps of
dynamically changing the data compression step from test request to test request.

6. The method of claim 1 further comprising the step of
inserting a time delay after each command sent to the controller by a host computer.

7. The method of claim 2 further comprising the step of
storing at each host computer the data, in raw data form, received by the host computer from the controller.

8. The method of claim 1 further comprising the step of
receiving, at the one host, parameters defining operation of the test requested, for all host computers participating in the test.

9. The method of claim 1 further comprising the step of
initializing said controller cache memory to a known state prior to said executing step.

10. The method of claim 1 further comprising the steps of
analyzing, at the one host computer, performance data of said mass storage system, and generating a write analysis of said system performance as a function of time.

11. The method of claim 10 further wherein said generating step comprises the step of
determining, for said test, the number of I/O writes as a function of time for said mass storage system.

* * * * *